(12) United States Patent
Jun et al.

(10) Patent No.: US 7,956,501 B2
(45) Date of Patent: Jun. 7, 2011

(54) MOTOR AND WASHING MACHINE USING THE SAME

(75) Inventors: Cha Seung Jun, Gyeonggi-do (KR); Byoung Wook Min, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 12/235,760

(22) Filed: Sep. 23, 2008

(65) Prior Publication Data
US 2009/0108693 A1   Apr. 30, 2009

(30) Foreign Application Priority Data
Oct. 30, 2007 (KR) .................. 10-2007-0109392

(51) Int. Cl.
*H02K 21/22* (2006.01)
(52) U.S. Cl. ............................. 310/67 R; 310/156.26
(58) Field of Classification Search ............. 310/156.01, 310/156.12, 156.26, 156.53, 67 R
See application file for complete search history.

(56) References Cited

U.S. PATENT DOCUMENTS

| | | | |
|---|---|---|---|
| 5,782,652 A | 7/1998 | Feher et al. | |
| 6,257,027 B1 * | 7/2001 | Imai | 68/12.12 |
| 6,396,177 B1 * | 5/2002 | Shin et al. | 310/63 |
| 6,460,382 B1 * | 10/2002 | Kim et al. | 68/140 |
| 6,681,602 B2 * | 1/2004 | Heyder et al. | 68/140 |
| 7,141,900 B2 | 11/2006 | Nakamura et al. | |
| 2002/0047365 A1 | 4/2002 | Yagyu et al. | |
| 2002/0050751 A1 | 5/2002 | Hashimoto et al. | |
| 2005/0200225 A1 | 9/2005 | Kim et al. | |
| 2005/0275297 A1 | 12/2005 | Suzuki et al. | |
| 2006/0022550 A1 | 2/2006 | Otsuji | |
| 2006/0091754 A1 | 5/2006 | Kim et al. | |
| 2006/0119204 A1 * | 6/2006 | Awazu et al. | 310/156.53 |
| 2006/0191301 A1 | 8/2006 | Park et al. | |
| 2006/0202587 A1 | 9/2006 | Agematsu | |
| 2007/0017261 A1 | 1/2007 | Chang et al. | |
| 2007/0236099 A1 | 10/2007 | Kim et al. | |
| 2007/0285852 A1 | 12/2007 | Gupta | |
| 2008/0122300 A1 | 5/2008 | Cho et al. | |
| 2008/0264114 A1 | 10/2008 | Jang et al. | |
| 2008/0265691 A1 | 10/2008 | Shikayama et al. | |

FOREIGN PATENT DOCUMENTS

| | | |
|---|---|---|
| CN | 1405951 | 3/2003 |
| EP | 1541738 | 6/2005 |
| GB | 2412015 | 9/2005 |
| JP | 62-119156 | 7/1987 |
| JP | 05-003653 | 1/1993 |
| JP | 09-10474 A | 1/1997 |
| JP | 2001-025183 | 1/2001 |
| JP | 2003-134712 | 5/2003 |
| JP | 2005-237110 | 9/2005 |

(Continued)

OTHER PUBLICATIONS

U.S. Appl. No. 12/235,728 to Jun et al, filed Sep. 23, 2008.

*Primary Examiner* — Quyen Leung
*Assistant Examiner* — Naishadh N Desai
(74) *Attorney, Agent, or Firm* — McKenna Long & Aldridge LLP

(57) ABSTRACT

Disclosed is a motor which includes a stator including a plurality of aluminum coils and a rotor. The rotor includes a frame including a magnetic material, and a permanent magnet attached to the frame. The permanent magnet is made of neodymium.

7 Claims, 3 Drawing Sheets

FOREIGN PATENT DOCUMENTS

| | | |
|---|---|---|
| JP | 2006-340743 A | 12/2006 |
| KR | 10-1998-0069372 | 10/1998 |
| KR | 10-2000-0028839 | 5/2000 |
| KR | 10-2004-0007762 A | 1/2004 |
| KR | 10-2005-0052010 | 6/2005 |
| KR | 10-2005-0066541 A | 6/2005 |

* cited by examiner

MOTOR AND WASHING MACHINE USING THE SAME

This application claims the benefit of Korean Application No. 10-2007-0109392, filed on Oct. 30, 2007, which is hereby incorporated by reference in its entirety.

BACKGROUND

The present disclosure relates to a motor and a washing machine using the same.

A washing machine is an apparatus that washes laundry using washing water and friction. In a drum washing machine, laundry is placed inside a drum which is oriented sideways in the washing machine, and a washing operation is performed through rising and falling motions of the laundry as the drum rotates at a low speed. Here, the drum lies sideways and its opening faces the front of the washing machine. A motor is located at the rear of the washing machine to deliver a rotational force to the drum. Since the motor is provided at the rear side of the drum washing machine, this increases the horizontal length of the washing machine, and thus increases the volume of the washing machine. When the volume of the washing machine increases, a larger installation space is required, which reduces user satisfaction of the washing machine, especially if indoor space is at a premium.

An outer rotor type motor is used as a motor for the drum washing machine. The motor includes a stator fixed on the rear side of a tub and including a plurality of circularly arranged coils, and a rotor connected to the drum and including a circularly disposed permanent magnet. An electromagnetic force generated between the coils and the permanent magnet causes the rotor to rotate. The rotational force of the rotor is determined by the intensity of the electromagnetic force. The electromagnetic force is determined by the intensity of the magnetic field of the permanent magnet and the intensity of the electric field generated by the coils. Therefore, it is preferable for the magnetic field of the permanent magnet to be as strong as possible, and for a high current to flow through the coils to generate a strong electric field. If a motor generates a strong electromagnetic force, its size does not need to be large.

In some conventional washing machines, the permanent magnet is a ferrite magnet, and the coils are made of copper. However, a recent increase in the price of copper has considerably increased the manufacturing costs of these washing machines.

Also, since a ferrite magnet provides a small magnetic field, a large ferrite magnet is required to generate a sufficient rotational force to drive the drum of the washing machine. To support a permanent magnet having a large volume and heavy weight, a pocket for receiving the permanent magnet is manufactured separately in the rotor, and the permanent magnet is inserted into the pocket. However, this manufacturing method not only complicates a manufacturing process of an injected material, but also increases manufacturing costs even more due to a difficulty of a molding process. Also, because the volume and mass of the motor increases, the rotation load also increases when the motor rotates, which generates noise and vibration in the motor.

Also, since a separate rotator core provided by injection is used, there is magnetic flux leakage, which deteriorates an output. To reduce the output deterioration, the structure of the rotor must become even more complicated, causing the mechanical strength of the rotor to be reduced and manufacturing costs to increase.

SUMMARY

Some of the features of the motor of the present invention are an increased rotational force, a simplified structure, reduced manufacturing costs, reduced vibration and noise, and reduced volume.

These features may be achieved by a motor which includes a stator including a plurality of aluminum coils, and a rotor including a frame including a magnetic material and a permanent magnet attached to the frame, where the permanent magnet is made of neodymium, as disclosed herein.

The permanent magnet may be attached to an inner wall of the frame, and the inner wall of the frame may be thicker than the permanent magnet. The coils may be coated with an insulator. The frame may be made of iron.

A curvature radius of an outer surface of the permanent magnet may be the same as a curvature radius of an inner wall of the frame, and chamfered portions may be formed on an inner surface of the permanent magnet.

Also disclosed is a washing machine which includes a tub that stores washing water, a drum provided inside the tub, a stator fixed on the tub and including a plurality of coils, and a rotor that rotates the drum. The rotor includes a frame including a magnetic material, and a neodymium magnet provided on an inner wall of the frame. The coils are made of a material having higher resistivity and lower density than that of copper.

The coils may be made of aluminum. The inner wall of the frame may be thicker than the neodymium magnet. The frame may be made of iron. A curvature radius of an outer surface of the permanent magnet may be the same as a curvature radius of the inner wall of the frame, and chamfered portions may be formed on an inner surface of the permanent magnet.

Also disclosed is a washing machine which includes a tub that stores washing water, a rotatable drum provided inside the tub, a stator fixed on the tub and including a plurality of coils, a rotor that rotates the drum, and a motor shaft that passes through the stator to connect the drum with the rotor. The rotor includes a frame including a magnetic material, and a permanent magnet attached to an inner wall of the frame. The permanent magnet is made of neodymium, and the inner wall of the frame is thicker than the permanent magnet.

The coils may be made of a material having higher resistivity and lower density than that of copper. The coils may be made of coated aluminum.

The details of one or more embodiments are set forth in the accompanying drawings and the description below. Additional advantages and features of the invention will be set forth in part in the description which follows and in part will become apparent to those having ordinary skill in the art upon examination of the following or may be learned from practice of the invention.

DETAILED DESCRIPTION OF THE EMBODIMENTS

Reference will now be made in detail to embodiments of the present invention, examples of which are illustrated in the accompanying drawings. However, the spirit of the present invention is not limited to the described embodiments, and other embodiments in which there is an addition, modification, and/or deletion of elements may fall within the scope of the present invention.

Figure 1:
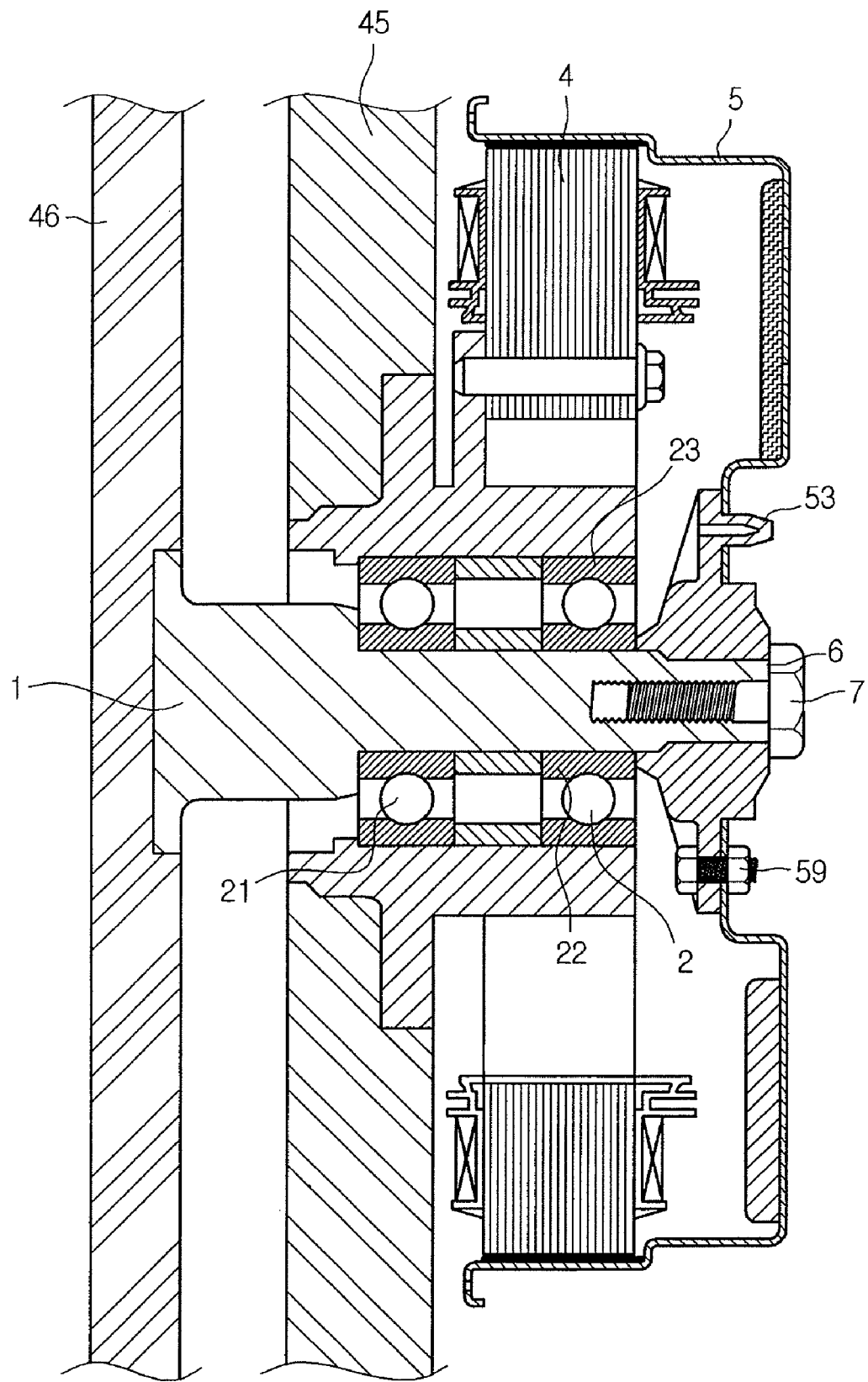
FIG. 1 is a cross-sectional view of a motor connected to a washing machine according to an embodiment of the invention.
Figure 2:
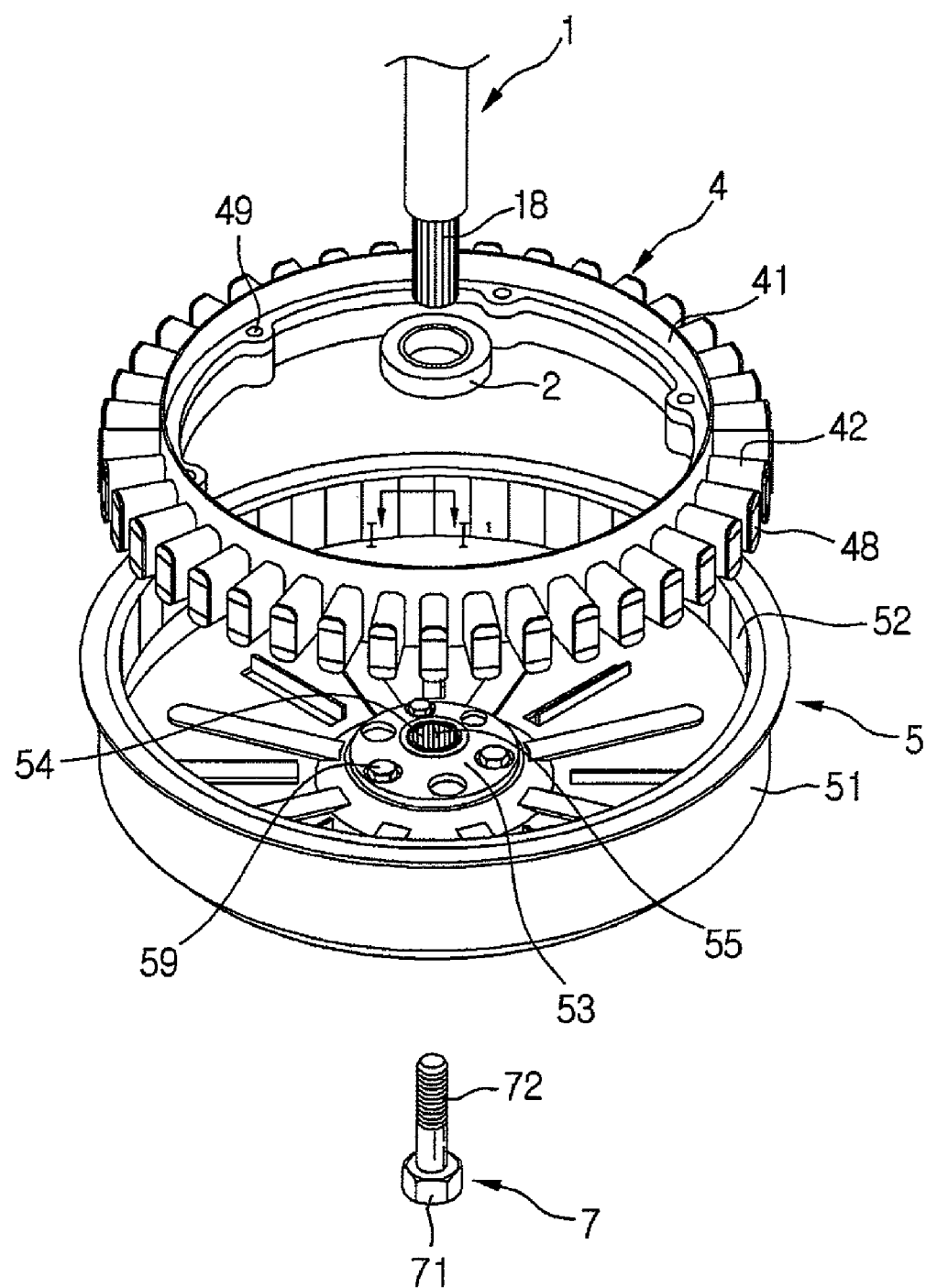
FIG. 2 is an exploded perspective view of the motor shown in FIG. 1.

FIG. 1 is a cross-sectional view of a motor connected to a washing machine according to an embodiment of the invention, and FIG. 2 is an exploded perspective view of the motor.

Referring to FIGS. 1 and 2, the motor includes a stator 4 which fixes to a rear side of a tub 45 of a washing machine, a rotor 5 within which the stator 4 is disposed, and a motor shaft 1 which is connected to the rotor 5 and a drum 46 of the washing machine.

The rotor 5 is provided with a bushing 53, which couples the motor shaft 1 to the rotor 5 by the motor shaft 1 being inserted into the bushing 53. A serration portion 18 is provided at an end of the motor shaft 1 that is inserted in the bushing 53. A hole 55 is provided in the bushing 53, and a serration portion 54 is provided along an inner wall of the hole 55. When the motor shaft 1 is inserted into the hole 55, the serration portion 18 engages with the serration portion 54 to prevent slippage between the motor shaft 1 and the rotor 5 in a rotational direction of the rotor 5.

The motor shaft 1 is stably supported by the tub 45, using a first bearing 21 and a second bearing 2, which are interposed between the outer periphery of the motor shaft 1 and a contact surface of the tub 45. The motor shaft 1 extends through the tub 45 and is coupled to the drum 46 to rotate the drum 46. Here, the bearings 2 and 21 include an outer wheel portion 23 supported by the tub 45, and an inner wheel portion 22 supported by the motor shaft 1 inside the outer wheel portion 23. A sliding motion is performed between the outer wheel portion 23 and the inner wheel portion 22 to allow the motor shaft 1 to stably rotate within the tub 45.

One or more coupling holes 49 are provided in a stator core 41 of the stator 4. A screw fits into each of the coupling holes 49 to secure the stator 4 to the rear side of the tub 45. A plurality of teeth 48 are provided around the outer periphery of the stator core 41, and stator coils 42 are coiled around each of the teeth 48. The teeth 48 generate an electromotive force through an interaction with the coils 42, causing the rotor 5 to rotate.

The rotor 5 includes a circular frame 51, which can be formed of a magnetic material, such as iron. The bushing 53 is seated on an approximately central portion of the frame 51, and a permanent magnet 52 is disposed on an inner wall of the frame 51. In the embodiment shown in FIGS. 1 and 2, the bushing 53 and the frame 51 are separate parts which are coupled together with coupling members 59, such as nuts and bolts. However, in an alternative embodiment, the bushing 53 may be integrally formed with the frame 51, such as through injection molding.

An operation of the motor is described below.

First, when an operating cycle of the washing machine begins, a current is applied to the stator coils 42, which causes the stator coils 42 to generate an electric field. The interaction of the electric field of the coils 42 with the magnetic field of the permanent magnet 52 causes a rotational force to be applied to the permanent magnet 52. Since the permanent magnet 52 is fixed to the frame 51, the whole rotor 5 rotates with the permanent magnet 52.

The motor shaft 1 rotates with the rotor 5, without slippage, due to the serration portions 18 and 54. As the rotor 5 rotates, a rotational state of the rotor 5 can be accurately detected by a Hall sensor (not shown) installed at the stator 4, and the current which is applied to the stator coils 42 can be controlled based on the detected rotational state of the rotor 5. Accordingly, the rotational state of the rotor 5 can be accurately controlled. Since the motor shaft 1 is connected to the drum 46, the drum 46 also rotates with the rotor 5 and the motor shaft 1.

The coils 42 are made of aluminum, and the permanent magnet 52 is made of neodymium (Nd). The coils 42 are coated with an insulator to prevent conduction between the coils. The coils 42 are made of aluminum for the reasons described below.

Copper, gold, silver, and aluminum are all conductive metals. The resistivity of silver is approximately 0.94 times the resistivity of copper, the resistivity of gold is approximately 1.39 times the resistivity of copper, and the resistivity of aluminum is approximately 1.60 times the resistivity of copper. Thus, of these metals, silver is the best current conductor. However, the price of aluminum is lower than the prices of these other metals, and the prices of silver and gold make use of these metals particularly unpractical.

Due to their difference in resistivities, for an aluminum coil to conduct the same amount of current as a copper coil, the volume of the aluminum coil must be greater than the volume of the copper coil. However, since the density of copper is approximately 8.92 $g/cm^3$, and the density of aluminum is approximately 2.70 $g/cm^3$, the mass of the aluminum coil will be less than the mass of the copper coil. Accordingly, using aluminum coils in place of copper coils results in a lighter motor.

Since aluminum coils do not conduct as much current as copper coils, a greater number of aluminum coils must be used to achieve the same amount of current conductance. A disadvantage of this is that it increases the size of the motor.

To overcome this problem, a neodymium magnet, such as an NdFeB sinter, is used as the permanent magnet 52. A neodymium magnet has a magnetism typically about ten times stronger than that of a magnetism of a ferrite magnet. Thus, a strong electromagnetic force can be generated even with a weak electric field. This makes it unnecessary to include a large number of aluminum coils in the motor.

In the exemplary embodiment described above, the coil is made of aluminum. However, the present invention is not limited to this example, as other metals having a lower density and higher resistivity than copper may be used.

Because of the strong magnetism of neodymium, when a neodymium magnet is used, the number of coils 42 may be reduced. Further, due to its strong magnetism, the neodymium magnet can be much smaller than that of conventional ferrite magnets. For example, even if a neodymium magnet is half the size of a conventional magnet, it can still cause a rotational force twice as great.

Since a neodymium magnet can be much less smaller and lighter than a conventional magnet, a separator rotator core provided in the form of an injection object to a rotator frame is not required to support the weight of the permanent magnet. Instead, the permanent magnet can be attached and fixed on the inner surface of the frame though adhesion. Since the permanent magnet is fixed on the frame made of metal through direct attachment without a separate rotator core formed of a resin, the permanent magnet has no magnetic flux leakage. As a result, the magnetic field is stronger, rotational force increases, the weight of the motor decreases, and vibration and noise are reduced.

Figure 3:
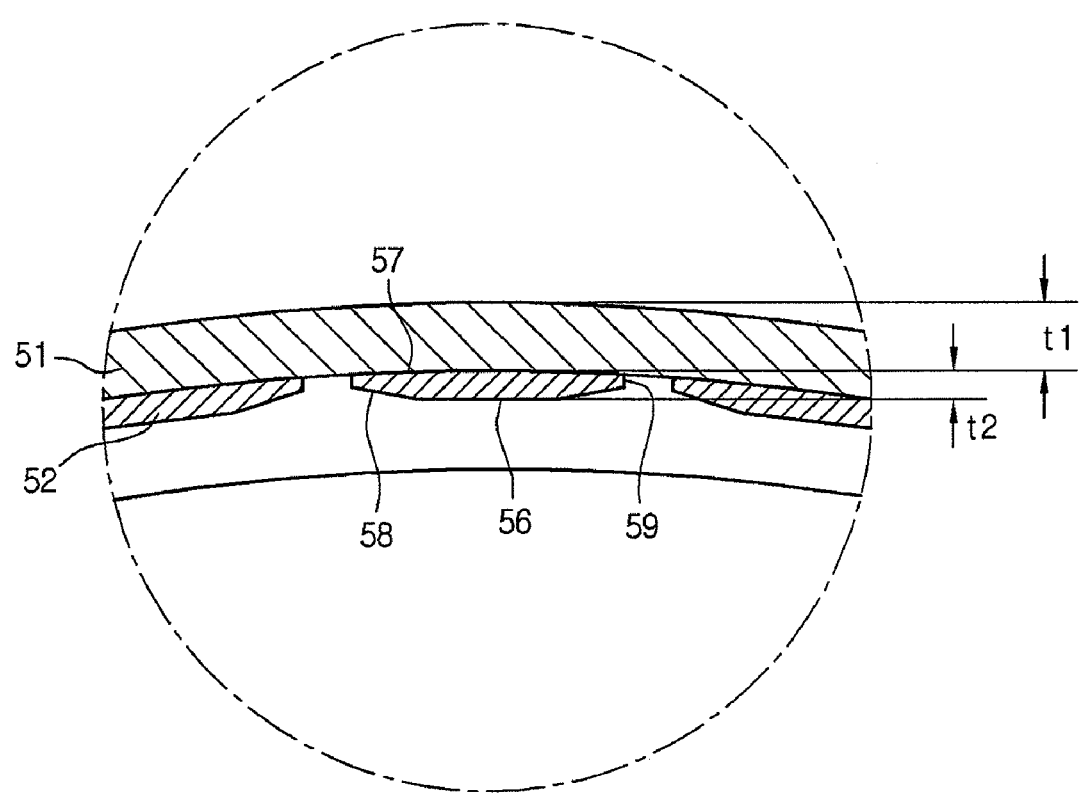
FIG. 3 is a cross-sectional view taken along a line I-I' of FIG. 2.

FIG. 3 is a cross-sectional view taken along a line I-I' of FIG. 2.

Referring to FIG. 3, neodymium magnets 52 are directly attached to a circular inner wall of the frame 51. The permanent magnets 52 can be fixed on the frame 51 through adhesion. For this purpose, the outer surface of the permanent magnet 52 can be manufactured to have the same curvature radius as that of the inner wall of the frame 51 to improve adhesion strength. The permanent magnet 52 can be manufactured in a thin plate shape because the permanent magnet 52 has a small volume and a light mass, and so there is little danger of detachment.

The frame 51 is manufactured to have a sufficient thickness as to allow a magnetic flux entering and leaving the permanent magnet 52 to pass through the frame without leakage. For this purpose, a thickness t1 of the inner wall of the frame 51 can be thicker than a thickness t2 of the permanent magnet 52. Accordingly, the rotor 5 can be simply formed by merely adhering the permanent magnet 52 to the inner wall of the frame 51.

Also, to prevent concentration of magnetic flux from the permanent magnet, the permanent magnet 52 includes a front portion 56 formed on the front of the magnet 52, and side portions 59 formed on sides of the magnet 52. Chamfered portions 58 are formed between the front portion 56 and the side portions 59. Concentration of the magnetic flux can be prevented by the chamfered portions 58.

As mentioned above, the coils 42 are not limited to aluminum coils. Rather, other conductive materials having a lower density and a lower price than copper may be used as alternatives. However, at the moment, coated aluminum is most preferable in aspects of price and convenience in manufacturing.

As discussed above, since neodymium has a strong magnetism, the magnet 52 can be thin, which allows it to be fixed on the inner wall of the frame 51 by adhesion. To improve adhesion strength, a predetermined groove may be formed in the frame 51 along the shape of the permanent magnet 52 and the permanent magnet 52 may be disposed in the groove, so that the permanent magnet 52 can be more solidly coupled to the frame 51. Alternatively, the frame 51 and the permanent magnet 52 can be coupled to each other using a predetermined coupling member. Of course, the adhesion method is preferable in aspects of simplification of a coupling method and a structure.

The coupling of the bushing 53 and the rotor 5 can be modified within the scope of the present invention. For example, the bushing 53 can be formed of metal, rather than resin. The bushing 53 can be formed through injection molding with the frame 51 by insertion in a mold. However, it is preferable that the bushing 53 is provided as a separate member formed of a resin, and fixed on the frame 51 afterwards in aspects of convenience in coupling and reduction in manufacturing costs.

As discussed above, the disclosed motor has an increased rotational force, a simplified structure and manufacturing process, a reduced manufacturing cost, reduced vibration and noise, reduced volume, and an improved operational reliability, as compared to conventional motors.

Although embodiments have been described with reference to a number of illustrations, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A motor comprising:
    a stator comprising a plurality of aluminum coils; and
    a rotor comprising:
        a frame comprising a magnetic material; and
        a permanent magnet directly attached to the frame, the permanent magnet being separated by a predetermined distance from the coils,
    wherein the frame:
        is formed of iron;
        has a thickness that is sufficient to allow magnetic force lines of the permanent magnet to pass through the frame, and
        the thickness is greater than that of the permanent magnet.

2. The motor according to claim 1, wherein the permanent magnet is attached to an inner wall of the frame.

3. The motor according to claim 1, wherein the coils are coated with an insulator.

4. The motor according to claim 1, wherein a curvature radius of an outer surface of the permanent magnet is the same as a curvature radius of an inner wall of the frame, and
   chamfered portions are formed on an inner surface of the permanent magnet.

5. A washing machine comprising:
   a tub that stores washing water;
   a rotatable drum provided inside the tub;
   a stator fixed to the tub and comprising a plurality of coils;
   a rotor separated by a predetermined distance from an outer periphery of the stator, and rotating together with the drum; and
   a motor shaft that passes through the stator to connect the drum with the rotor, wherein the rotor comprises:
   a frame comprising a magnetic material; and
   a permanent magnet directly attached to the frame, the permanent magnet being separated by a predetermined distance from the coils, the permanent magnet being made of neodymium,
   wherein the frame:
   is formed of iron;
   has a thickness that is sufficient to allow magnetic force lines of the permanent magnet to pass through the frame, and
   the thickness is greater than that of the permanent magnet.

6. The washing machine according to claim 5, wherein the coils are made of a material having higher resistivity and lower density than that of copper.

7. The washing machine according to claim 5, wherein the coils are made of coated aluminum.

* * * * *